United States Patent [19]

Takahashi et al.

[11] Patent Number: 5,107,707
[45] Date of Patent: Apr. 28, 1992

[54] GAS FLOW TYPE ANGULAR VELOCITY SENSOR

[75] Inventors: Tsuneo Takahashi; Masayuki Ikegami; Tomoyuki Nishio; Takahiro Gunji, all of Saitama, Japan

[73] Assignee: Honda Giken Kogyo Kabushiki Kaisha, Tokyo, Japan

[21] Appl. No.: 541,706

[22] Filed: Jun. 21, 1990

[30] Foreign Application Priority Data

Jun. 28, 1989 [JP] Japan .................................. 1-165762

[51] Int. Cl.$^5$ .............................................. G01P 9/00
[52] U.S. Cl. ................................................ 73/516 LM
[58] Field of Search ................. 73/505, 515, 516 LM, 73/204.22, 204.26

[56] References Cited

U.S. PATENT DOCUMENTS

| | | | | |
|---|---|---|---|---|
| 3,205,715 | 9/1965 | Meek | ............................. | 73/516 LM |
| 4,467,984 | 8/1984 | Tippetts | ............................. | 73/515 |
| 4,696,188 | 9/1987 | Higashi | ............................. | 73/204.26 |
| 4,829,818 | 5/1989 | Bohrer | ............................. | 73/204.22 |

Primary Examiner—John E. Chapman
Attorney, Agent, or Firm—Lyon & Lyon

[57] ABSTRACT

A gas flow type angular velocity sensor comprising two semiconductor substrates with all components formed thereon by use of semiconductor technology and IC technology, which are coupled with each other to form therein a pair of heat wires, a gas path and a nozzle hole for injecting a gas flow toward the paired heat wires in the gas path. Two heat wires of the pair change their resistance-temperature characteristics in accordance with a deflection of the gas flow due to the action of angular velocity and a difference between two changed values is picked up and amplified by a resistance bridge circuit and an amplifier circuit formed on the semiconductor substrates to produce an output signal proportional to the angular velocity to be measured. A miniature pump formed on semiconductor substrates and drivable by a piezoelectric element provides a stabilized gas flow in the sensor. As thus constructed the sensor is compact, accurate and suitable for mass-production and free from disadvantages of conventional sensors.

18 Claims, 5 Drawing Sheets

GAS FLOW TYPE ANGULAR VELOCITY SENSOR

BACKGROUND OF THE INVENTION

The present invention relates to a gas flow type angular velocity sensor which is capable of sensing an angular velocity acting on the sensor's body.

Generally, a gas flow type angular velocity sensor is constructed in such a way that a gas is forced into a gas path 10 in a closed casing 8 through a nozzle hole 9 to flow therealong toward a flow sensor 11 consisting of a pair of heat wires 111, 112 as shown in FIG. 9. When an angular velocity "ω" is applied on the sensor body, the gas flow is deflected to one side by a value of deflection "ε" from an axis 0—0 as shown in FIG. 10. This produces a difference between temperature sensitive outputs of two heat wires 111, 112 made of tungsten or a like material having a high temperature resistance coefficient. The difference is picked up for determining therefrom a direction and a magnitude of the angular velocity "ω" acting on the sensor body.

The heat wires 111, 112 are arranged opposite to each other at both sides of the centerline 0—0 of the nozzle hole 9 and the gas path 10. When no lateral angular velocity "ω" acts on the sensor body, gas injected through the nozzle hole 9 flows straight along the line 0—0 and evenly over the wires 111 and 112.

Consequently, it becomes possible to measure a value of change in moving direction of a moving body when the latter is equipped with such a gas flow type angular velocity sensor.

In FIG. 9, at least two flow-rectifying holes 14 are arranged at opposite sides along the axis of the nozzle hole 9 so as to rectify a flow of gas injected into a gas path 10 through a nozzle hole 9.

Since its detecting accuracy depends upon the accuracy of finishing of its components, the detector must have a precisely formed nozzle hole 9 and gas path 10 so that gas forced into the gas path 10 through the nozzle hole 9 may flow straight along a center line 0—0 when no lateral angular velocity "ω" acts on the sensor body.

In a conventional gas flow type angular velocity sensor the nozzle hole 9 and gas path 10 are formed by cutting aluminum tubes.

However, said method for making the nozzle hole 9 and the gas path 10 requires a high technique of precision working.

In the gas flow type angular velocity sensor, since the finer the heat wires 111 and 112 are; the higher the sensitivity of the sensor 11 is, i.e. less displacement of the gas flow can be detected, the heat wires 111 and 112 are usually formed about 5 μm in diameter.

Usually, each of the heat wires 111 and 112 is formed as a fine filament and then stretched between two supporting electrodes 17 mounted on a base plate 16 as shown in FIG. 11.

As shown in FIG. 9, the conventional gas flow type angular velocity sensor is provided at one end of its casing 8 with a diaphragm pump 12 whereby gas filled in the closed casing 8 is circulated in such a way that it flows through a path 13 and then through a nozzle hole 9 enters into a gas path 10 to create therein a laminar flow.

Furthermore, in the conventional gas flow type angular velocity sensor shown in FIG. 9, a circuit board 15, whereon an amplifier circuit and all portions of the resistance bridge circuit except the paired heat wires are attached to one end of the casing 8 as separated from sensor body. In this case soldered lead-wire connections must be made between the paired heat wires in the sensor body and corresponding terminals on the circuit board 15. This causes a contact resistance at the connections and thermoelectromotive force due to dissimilar metals' junction and correspondingly the accuracy of angular velocity measurement drops.

SUMMARY OF THE INVENTION

In view of the foregoing, the present invention was made to provide a gas flow type angular velocity sensor which is so constructed that nozzle holes and gas path may be easily formed therein with a high accuracy of their finishing.

It is another object of the invention to provide a gas flow type angular velocity sensor having a pair of easily formed heat wires with a stabilized material composition and uniform resistance-temperature characteristic with no need for after-treatment such as annealing or the like.

It is another object of the invention to provide a a gas flow type angular velocity sensor which is capable of effectively creating a stabilized gas flow therein by incorporating a small precision type pump in an optimum condition in the sensor body.

It is further object of the invention to provide a compact and accurate gas flow type angular velocity sensor which can accommodate a resistance bridge circuit composed of a pair of heat wires and known standard resistances and also an amplifier circuit for amplifying the thereby eliminating the above-mentioned prior art's disadvantages concerning the lead-wire connections and the temperature drift to induce a noise.

DESCRIPTION OF THE PREFERRED EMBODIMENTS

Figure 1:
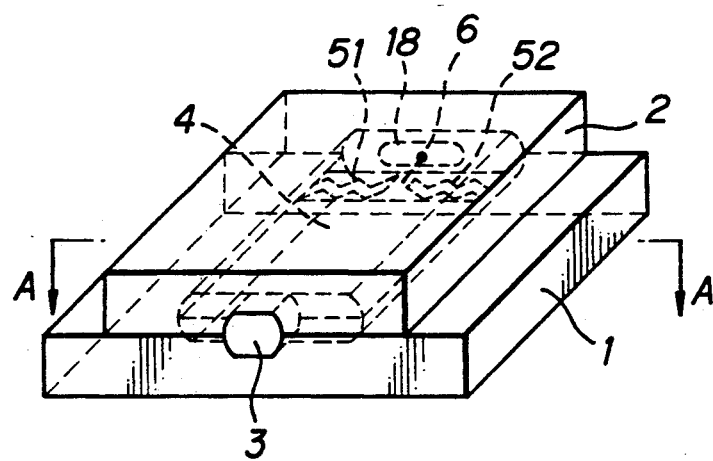
FIG. 1 is a perspective view showing a body portion of a gas flow type angular velocity sensor embodying the present invention.
Figure 2:
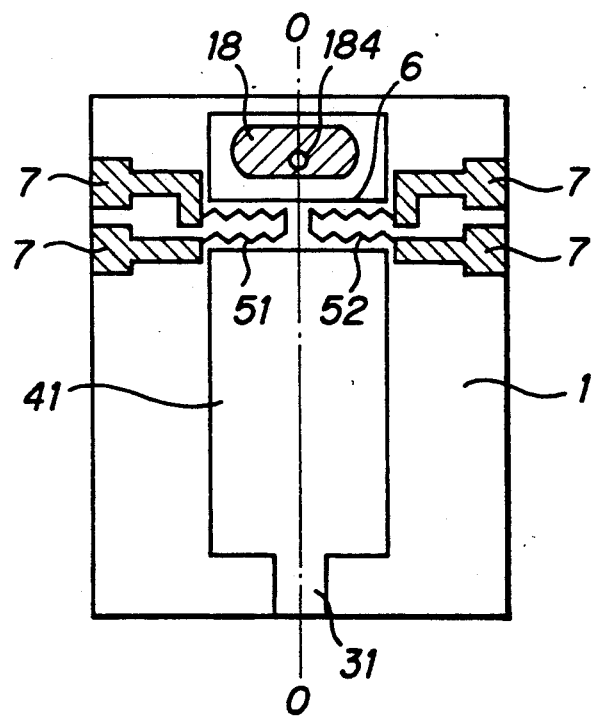
FIG. 2 is a plan view showing an example of a construction of a lower semiconductor substrate of the sensor body.
Figure 3:
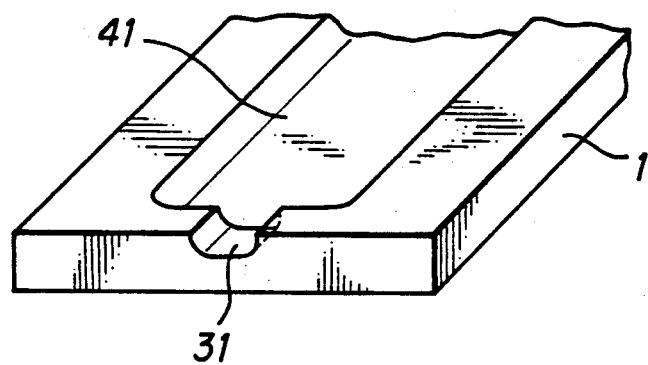
FIG. 3 is a partial perspective view of the lower semiconductor substrate.
Figure 4:
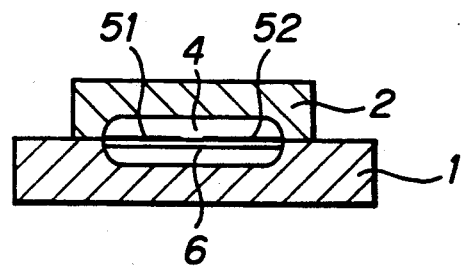
FIG. 4 is a sectional view taken along line A—A of FIG. 1.

In order to achieve the above-mentioned purposes, the present invention is directed to form a nozzle hole and a gas path by etching semiconductor substrates by use of a semiconductor technology.

This invention is also directed to form a pair of heat wires serving as a flow sensor by etching a heat wire metal previously deposited in vacuum on the semiconductor substrate by use of the semiconductor technology.

This invention is also directed to compactly (with a high degree of integration) form by use of an IC technology a miniature pump to be driven by a piezoelectric element on the semiconductor substrates with the gas path formed thereon.

This invention is also directed to compactly forming a resistance bridge circuit and an amplifier circuit on a semiconductor substrate with the gas path formed thereon, by using IC technology.

Referring now to the drawings, an embodiment of the present invention will be described in detail as follows:

As shown in FIGS. 1-4, a gas flow type angular velocity sensor is composed of an upper and a lower semiconductor cases or substrates 1 and 2, on each of which a half-hole 31 of a nozzle opening or hole 3 and a half-groove 41 of a gas chamber or path 4 are formed by an etching method. The cases 1 and 2 are laid on and adhered to each other to form a nozzle 3 and a gas path 4 therein.

Application of the etching technique for manufacturing semiconductors can easily and precisely make the nozzle holes 3 and the gas paths 4 on semiconductor substrates with accuracies of submicron order and in a large quantity.

Therefore, as opposed to the prior art which is based upon individual production by skilled persons, the present invention makes it possible to easily produce a large quantity of the sensors of uniform quality with a high yield.

Having an accurately made nozzle hole and gas path, the sensor is capable of injecting gas into the gas path 4 through the nozzle hole 3 to create a gas flow going straight along the axis 0—0 of the gas path when no angular velocity is being applied to the sensor body. This improves the detection accuracy of the sensor.

Since the nozzle hole 3 and the gas path 4 can be precisely made in a very small size, it is possible to realize miniaturization of the gas flow type angular velocity sensor.

It is, of course, possible to provide gas flow rectifying holes (see FIG. 6) at opposite sides along the nozzle hole 3, if the rectification of the gas flow in the gas path 4 is needed, by etching half-holes composing each flow-rectifying hole together with half-holes for nozzle and the half-grooves for the gas path on the upper and the lower substrates.

Flow-rectifying holes together with the nozzle hole and the gas path can be made uniformly with high accuracy in their positions and sizes.

A bridge portion 6 is formed over the half-groove composing the gas path 4 on the lower semiconductor substrate by an etching method and then a pair of heat wires 51 and 52 are formed on said bridge portion 6.

The bridge portion 6 is provided at the height corresponding to a substantially middle height of the gas path 4.

The paired heat wires 51 and 52 are formed according to a given pattern by etching and trimming the tungsten or platinum material previously deposited on the upper surface of the bridge portion 6 by evaporating or crystal growing method.

In this case, each of heat wires 51 and 52 may be formed of such a pattern that a total length of each wire is sufficient to detect the gas flow with a high sensitivity.

Figure 5:
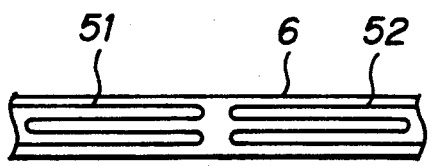
FIG. 5 is a view showing another example of a pattern of heat wires.

FIG. 5 shows another example of a pattern of the paired heat wires 51 and 52.

Electrodes 7 for connection with the heat wires 51 and 52 are formed in such a process that material of the same kind as that of the heat wires 51 and 52 is deposited by evaporation on given portions adjoining the both ends of the bridge portion 6 on semiconductor substrate 1 and then a given pattern of each electrode is etched on a given portion and finished by trimming.

Since the heat wires 51 and 52 can be precisely formed in a simultaneous process by applying semiconductor technology, it is assured to easily make a large quantity of the paired heat wires being free from variations in their material composition, crystal structure and resistance-temperature characteristic.

Since the heat wires 51 and 52 and electrodes 7 can be integrally made with each other of the same kind of metal, the necessity of gold bonding means for connecting heat wires with electrodes as seen in the prior art is omitted. Thus the possibilities of lowering detection sensitivity of the heat wires due to the existence of dissimilar metal such as gold or the like and also of decreasing its detection accuracy due to thermoelectromotive force produced by the dissimilar metal are eliminated.

A miniature pump 18 to be driven by a piezoelectric element is formed compactly at an inner downstream part from the heat wires 51, 52 in the gas path 4 on the lower semiconductor substrate 1.

Figure 6:
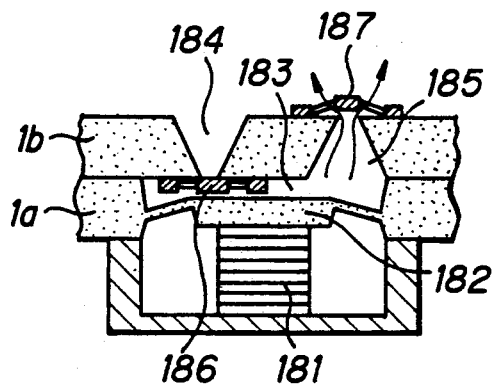
FIG. 6 is a front sectional view showing an example of a construction of a miniature pump.

FIG. 6 shows a typical construction of miniature pump 18.

In FIG. 6, a diaphragm 182 drivable by a piezoelectric element 181 is formed by etching the semiconductor (Si) substrate 1a. A pumping chamber 183 is formed by placing a semiconductor substrate 1b on the semiconductor substrate 1a. A suction port 184 and a delivery port 185 are also formed by etching the substrate 1b. A suction valve 186 and a delivery valve 187 are formed in the suction port 184 and the delivery port 185 respectively.

Since the miniature pump is formed compactly by use of the IC technology on the portion of the semiconductor substrate 1 whereon the gas path is formed, it is possible to incorporate the precision miniature pump in sensor body.

Consequently, the minature pump 18 can effectively create a stabilized gas flow that makes it possible to accurately detect an angular velocity acting on the sensor body.

Therefore, it is also possible to easily and effectively produce sensors of uniform quality in a large quantity.

Figure 7:
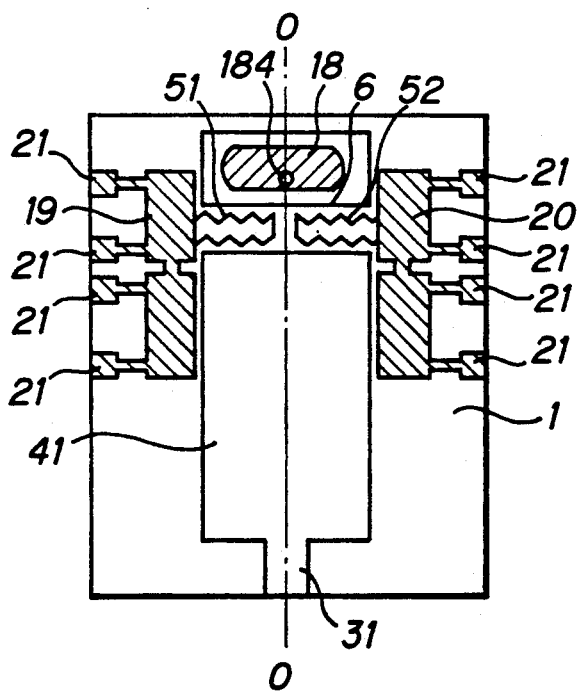
FIG. 7 is a plan view showing another example of a construction of the lower semiconductor substrate.

As shown in FIG. 7, integrated circuits 19 and 20 are respectively provided at the opposite sides of a half-groove 41 for forming gas path 4 on the semiconductor substrate 1.

Each of the integrated circuits 19 and 20 compactly includes a part of a resistance bridge circuit (excepting a heat wire 51 or 52) for detecting an angular velocity and also an amplifier circuit for amplifying the detection signal from the resistance bridge circuit.

At the same time, in the integrated circuit of the resistance bridge all components' parts excepting the heat wires 51 and 52 are formed in contact with the respective heat wires 51 and 52 formed on the bridge 6.

In FIG. 7, external connection terminals 21 formed together with the integrated circuits 19 and 20 are used as terminals for connection with a power supply source for the resistance bridge circuit or for wiring for outputting the angular velocity detection signal from the amplifier circuit.

Since the resistance bridge circuit and the amplifier circuit are formed compactly on the semiconductor substrate with the gas path formed thereon, it is possible to very compactly incorporate the above-mentioned circuits in the sensor body in an optimum position assuring no interference with angular velocity detection.

At the same time, two standard resistances can be formed by use of the IC technology to be of a correct resistance for two respective branch lines of the resistance bridge circuit. These standard resistances can be also arranged in positions free from affection of the gas flow.

Accordingly, in contrast to the prior art wherein the lead wire connections are made between the heat wires 51, 52 and other parts of the resistance bridge circuit and between the resistance bridge circuit and the amplifier circuit, the present invention requires no connections between the above-mentioned components the circuits and this completely eliminates the possibility of causing a contact resistance at the lead-wire connections and thermoelectromotive force functions of the dissimilar metals. The accuracy of angular velocity detection is therefore improved.

The paired heat wires 51, 52 provided on the gas path 4 and other component parts of the resistance bridge circuit and the amplifier circuit are placed under the same temperature condition. The possibility of inducing a noise due to a temperature drift in the circuits can be effectively reduced.

Figure 8:
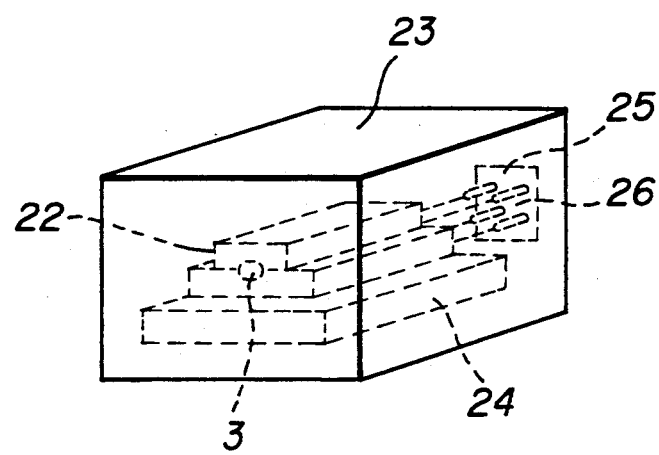
FIG. 8 is a perspective view showing a general construction of a gas flow type angular velocity sensor according to the present invention.
Figure 9:
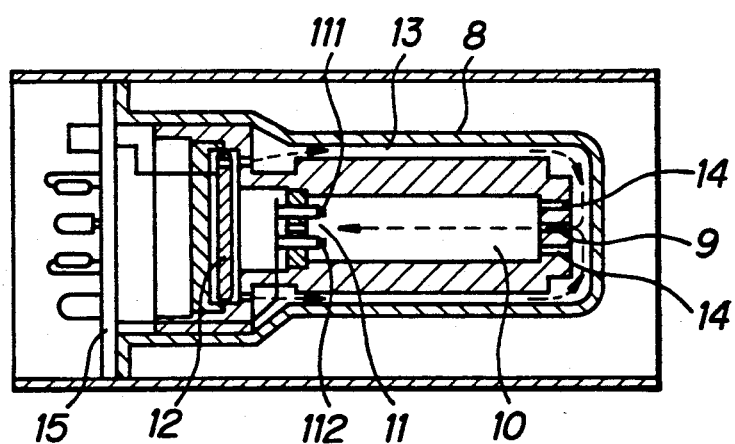
FIG. 9 is a front sectional view showing a conventional gas flow type angular velocity sensor.
Figure 10:
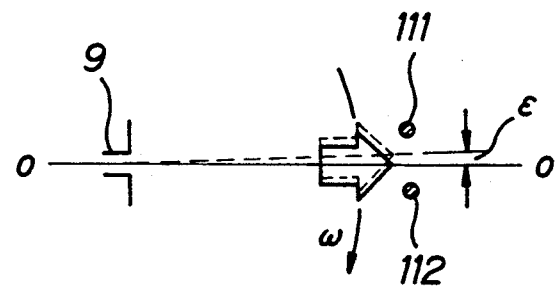
FIG. 10 is a view showing a deflected gas flow when an angular velocity is applied to a conventional gas flow type angular velocity sensor.
Figure 11:
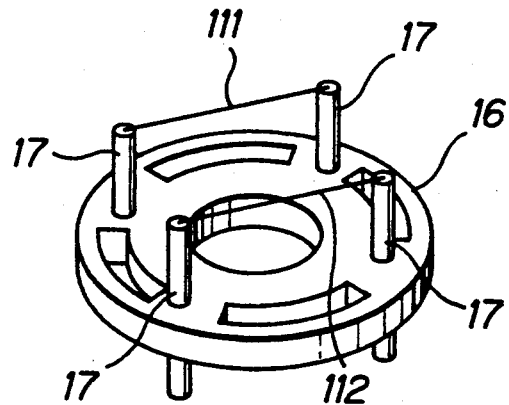
FIG. 11 is a perspective view showing a flow sensor of a conventional gas flow type angular velocity sensor.

FIG. 8 shows a working state of an angular velocity sensor according to the present invention.

In this embodiment, a sensor body 22, which consists of an upper and a lower semiconductor substrates having therein a nozzle hole 3, a gas path 4 with a pair of heat wires 51 and 52 and incorporates a miniature pump 18 in the inner part thereof, is placed on a base 24 in a gas-filled case 23 and is put into working state by driving the pump to force the gas into the gas path 4 of the sensor body through the nozzle hole 3 creating gas circulation in the case 23.

In FIG. 8, power supply terminals and output terminals are designated with numerals 25 and 26 respectively.

Since all parts of the gas flow type angular velocity sensor can be formed by utilizing the semiconductor technology and the IC technology, it becomes possible to obtain a small and precise gas flow type angular velocity sensor adequate for mass production.

As apparent from the foregoing description, in a gas flow type angular velocity sensor wherein an output signal corresponding to a difference in temperature sensitive outputs of paired heat wires is produced when a flow of gas injected into a gas path through a nozzle hole and directed toward the paired heat wires is deflected by the action of an angular velocity on the gas flow, the present invention forms the nozzle hole and the gas path in such a way that upper halves and lower halves of a nozzle hole and a gas path are etched on an upper and a lower semiconductor substrates. The substrates are placed on each other to match the halves of holes and grooves, thereby providing such advantages that the nozzle hole and the gas path can be easily formed with improved accuracy and productability.

An advantage of the gas flow type angular velocity sensor according to the present invention is that the heat wires are made by etching their materials previously deposited on the upper or the lower semiconductor substrate. The best wires therefore have a stabilized material composition and crystal structure and a uniform resistance temperature characteristic. The best wires can be easily and effectively formed in the sensor making the sensor suitable for mass production.

Another advantage of the gas flow type angular velocity sensor according to the present invention is that since a miniature pump drivable by a piezoelectric element is formed compactly on the semiconductor substrate within the gas path, it is possible to create a stabilized gas flow in the sensor at a high efficiency by use of the precisely formed miniature pump which can preferably be incorporated in the sensor body.

Further advantage of the gas flow type angular velocity sensor according to the present invention are that since in addition to forming the gas path by etching the semiconductor substrates a resistance bridge circuit consisting of a paired heat wires and resistances having a known resistance value for detecting an angular velocity and an amplifier circuit for amplifying a detection signal from the resistance bridge circuit are formed compactly on the same semiconductor substrates, all circuit components can be efficiently and compactly arranged in the sensor body and with no interference with angular velocity detection thereby the disadvantages of the prior art such as the occurrence of contact resistance through lead-wire connections and of thermoelectromotive force through dissimilar metals' junctions are eliminated. All circuit components can be placed under the same temperature condition, thereby the occurrence of noise due to a temperature drift is effectively reduced and the detection accuracy is improved.

What is claimed is:

1. In a gas flow type angular velocity sensor of the type wherein an output corresponding to a difference in two temperature-sensitive outputs of a pair of heat wires is obtainable when a flow of gas forced into a gas path in a sensor body through a nozzle hole and directed toward the pair of heat wires is deflected by the action of an angular velocity on the gas flow, the improvement comprising:

an upper and a lower semiconductor, substrate each having etched thereon a half-hole of the nozzle hole and a half-groove of the gas path, with the substrates aligned on each other by matching the etched half-holes and half-grooves to form the nozzle hole and the gas path with at least one of the substrates having a previously applied layer of conductive material; and the pair of heat wires comprising a prescribed pattern of material etched from the previously applied layer on one of the upper and lower substrates.

2. A gas flow type angular velocity sensor according to claim 1, characterized in that the materials of the paired heat wires are formed on the semiconductor substrate by vapour deposition.

3. A gas flow type angular velocity sensor according to claim 1, characterized in that a bridge portion stretching over the gas path is formed by etching the semiconductor substrate and the paired heat wires are formed on the bridge portion.

4. A gas flow type angular velocity sensor according to claim 1, characterized in that each of the pair of wires is in a zig-zag pattern.

5. A gas flow type angular velocity sensor according to claim 1 further comprising a miniature pump drivable by a piezoelectric element and compactly formed as an integrated circuit on one of the semi-conductor substrates within the gas path.

6. A gas flow type angular velocity sensor according to claim 5, characterized in that the miniature pump is formed at a downstream side from the paired heat wires in the gas path.

7. The sensor of claim 1 further comprising:
a gas path formed by etching the semiconductor substrates;
a resistance bridge circuit formed on at least one of the substrates; and
an amplifier circuit formed on at least one of the substrates.

8. The sensor of claim 1 wherein the previously applied layer comprises a member selected from the group consisting of tungsten and platinum.

9. A gas flow type angular velocity sensor according to claim 1, wherein the pair of wires is formed in a looping switchback pattern.

10. A gas flow type angular velocity semiconductor sensor comprising:
an upper semiconductor case,
a lower semiconductor case,
a nozzle opening formed between the upper case and the lower case by an etching process,
a gas path chamber formed between the upper case and the lower case by an etching process, and
a pair of heat wires formed in the gas path chamber by etching a layer of conductive material previously applied on one of the upper and the lower semiconductor cases.

11. A gas flow type angular velocity semiconductor sensor according to claim 10, characterized in that the materials of the paired heat wires are formed on the semiconductor case by a vapor deposition process.

12. A gas flow type angular velocity semiconductor sensor according to claim 10, characterized in that a bridge portion stretching over the gas path chamber is formed by etching the semiconductor case and the paired heat wires are formed on the bridge portion.

13. A gas flow type angular velocity semiconductor sensor according to claim 10, characterized in that each of the pair of wires is formed in a zig-zag pattern.

14. A gas flow type angular velocity semiconductor sensor according to claim 10, further comprising a miniature pump drivable by a piezoelectric element and formed compactly as an integrated circuit on one of the semiconductor cases within the gas path chamber.

15. A gas flow type angular velocity semiconductor sensor according to claim 14, characterized in that the miniature pump is formed at a downstream side from the paired heat wires in the gas path chamber.

16. The sensor of claim 10 further comprising:
a gas path formed by etching the semiconductor substrates;
a resistance bridge circuit formed on at least one of the substrates; and
an amplifier circuit formed on at least one of the substrates.

17. The sensor of claim 10 wherein the previously applied layer of conductive material comprises a member selected from the group consisting of tungsten and platinum.

18. A gas flow type angular velocity semiconductor sensor according to claim 10, wherein the pair of wires is formed in a looping switchback pattern.

* * * * *